United States Patent
Hooker

(10) Patent No.: US 8,390,252 B2
(45) Date of Patent: Mar. 5, 2013

(54) CHARGING DEVICE, SYSTEM, AND METHOD FOR CONTROLLING A CHARGING DEVICE

(75) Inventor: John Kenneth Hooker, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/242,238

(22) Filed: Sep. 23, 2011

(65) Prior Publication Data

US 2012/0091956 A1    Apr. 19, 2012

(51) Int. Cl.
*H02J 7/04* (2006.01)
*B60K 6/20* (2007.10)
*B60L 1/00* (2006.01)

(52) U.S. Cl. ....... 320/109; 320/107; 320/108; 180/65.1; 180/65.21; 307/10.1

(58) Field of Classification Search .................. 320/109
See application file for complete search history.

(56) References Cited

U.S. PATENT DOCUMENTS

| | | | |
|---|---|---|---|
| 6,430,483 B2 * | 8/2002 | Takaoka et al. | 701/22 |
| 6,917,124 B2 * | 7/2005 | Shetler et al. | 307/66 |
| 7,256,516 B2 * | 8/2007 | Buchanan et al. | 307/62 |
| 2001/0020789 A1 * | 9/2001 | Nakashima | 290/40 C |
| 2003/0048006 A1 * | 3/2003 | Shelter et al. | 307/64 |
| 2009/0139781 A1 | 6/2009 | Straubel | |
| 2010/0134067 A1 | 6/2010 | Baxter et al. | |
| 2011/0029144 A1 | 2/2011 | Muller et al. | |
| 2011/0029146 A1 | 2/2011 | Muller et al. | |

* cited by examiner

*Primary Examiner* — Yalkew Fantu
(74) *Attorney, Agent, or Firm* — Global Patent Operation

(57) ABSTRACT

A charging device for use with an electric vehicle having a power storage device includes a current control device configured to selectively enable current to be received from an electrical distribution device and supplied to the power storage device. The charging device also includes a processor coupled to the current control device. The processor is configured to determine a first amount of current available to be at least one of received from the electrical distribution device and supplied by the charging device, and control the current control device to enable a second amount of current to be at least one of received from the electrical distribution device and supplied to the power storage device if the second amount of current does not exceed the first amount of current determined to be available.

20 Claims, 4 Drawing Sheets

US 8,390,252 B2

CHARGING DEVICE, SYSTEM, AND METHOD FOR CONTROLLING A CHARGING DEVICE

BACKGROUND OF THE INVENTION

The present application relates generally to charging devices and, more particularly, to a charging device, a system, and a method for controlling a charging device.

As electric vehicles and/or hybrid electric vehicles have gained popularity, an associated need to manage delivery of electrical energy to such vehicles has increased. In addition, a need to provide safe and efficient charging devices or stations has been created by the increased use of such vehicles.

At least some known charging stations include a power cable or other conductor that may be removably coupled to the electric vehicle. The charging stations receive electricity from an electric utility distribution network or another electricity source, and deliver electricity to the electric vehicle through the power cable.

In at least some electric utility distribution networks, a plurality of charging devices receive electricity from a common electrical distribution component, such as a transformer. However, if each charging device operates concurrently to supply charging current to an electric vehicle, the current supplied to the electrical distribution component may exceed a rated current limit of the component. In such situations, the electrical distribution component may be damaged and/or a circuit breaker or another protection device may activate to disable power to all charging devices coupled to the electrical distribution component.

BRIEF DESCRIPTION OF THE INVENTION

In one embodiment, a charging device for use with an electric vehicle having a power storage device is provided that includes a current control device configured to selectively enable current to be received from an electrical distribution device and supplied to the power storage device. The charging device also includes a processor coupled to the current control device. The processor is configured to determine a first amount of current available to be at least one of received from the electrical distribution device and supplied to the charging device, and control the current control device to enable a second amount of current to be at least one of received from the electrical distribution device and supplied to the power storage device if the second amount of current does not exceed the first amount of current determined to be available.

In another embodiment, a system for use in providing current to a plurality of electric vehicles is provided that includes a first charging device configured to receive current from an electrical distribution device and supply at least a portion of the current received to a first power storage device, and a second charging device configured to receive current from the electrical distribution device and supply at least a portion of the current received to a second power storage device. The first charging device includes a current control device configured to selectively enable current to be received from the electrical distribution device and supplied to the first power storage device. The first charging device also includes a processor coupled to the current control device. The processor is configured to determine a first amount of current available to be at least one of received from the electrical distribution device and supplied to the first power storage device, and control the current control device to enable a second amount of current to be at least one of received from the electrical distribution device and supplied to the first power storage device if the second amount of current does not exceed the first amount of current determined to be available.

In yet another embodiment, a method for controlling a charging device for use with an electric vehicle is provided that includes determining a desired amount of current to be at least one of received by the charging device and supplied to a power storage device of the electric vehicle. An amount of current available to be at least one of received by the charging device from an electrical distribution device and supplied to the power storage device is determined, and a current control device of the charging device is controlled to enable the desired amount of current to be at least one of received and supplied if the desired amount of current does not exceed the amount of current determined to be available.

DETAILED DESCRIPTION OF THE INVENTION

In some embodiments, the term "electric vehicle" refers generally to a vehicle that includes one or more electric motors. Energy used by the electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. In addition, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
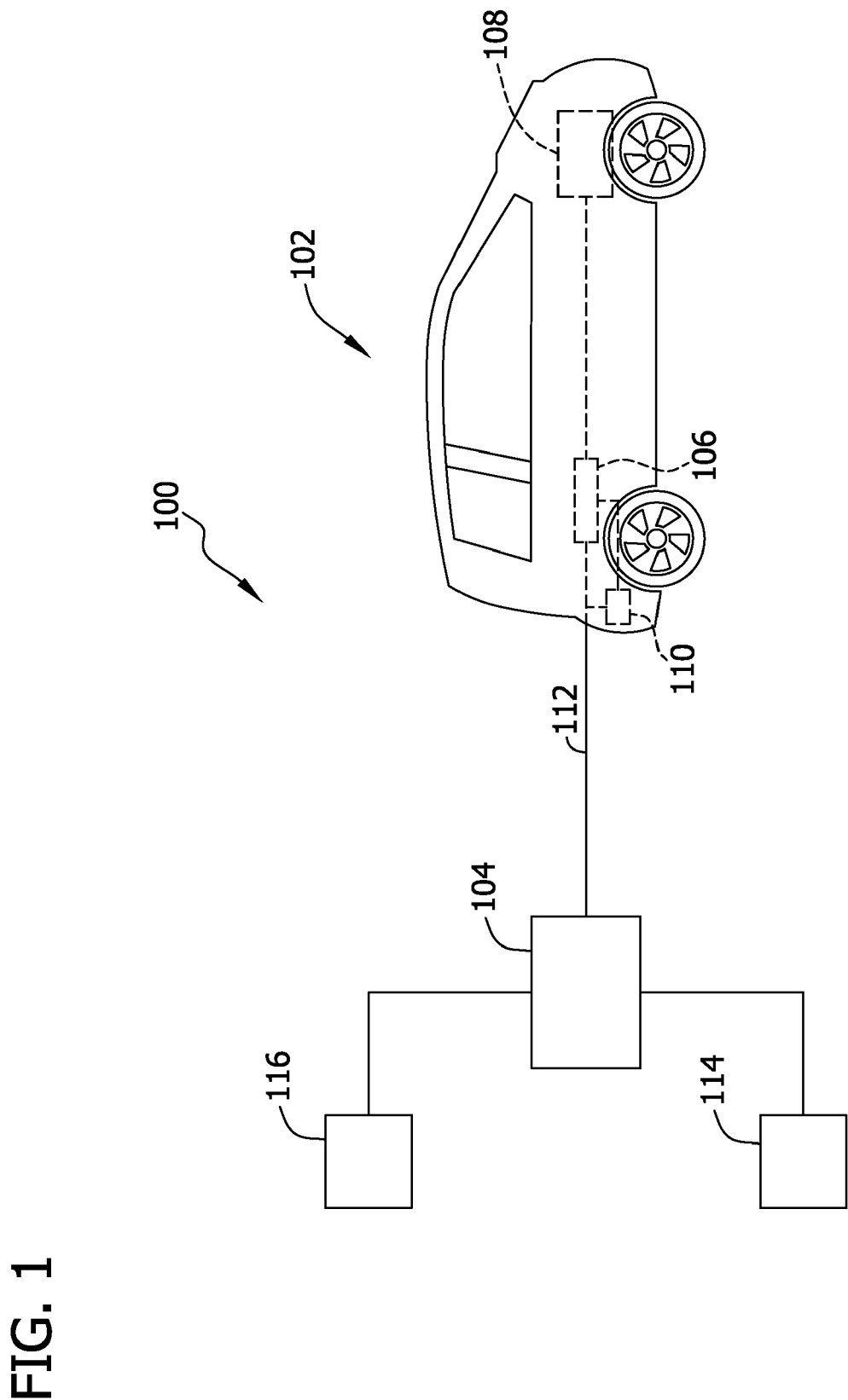
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. In an exemplary embodiment, electric vehicle 102 includes at least one power storage device 106, such as a battery and/or any other storage device, coupled to a motor 108. In an exemplary embodiment, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown) and/or by inductive coupling such that no conduit 112 is used. In an exemplary embodiment, power conduit 112 includes at least one conductor (not shown) for supplying electricity to power storage device 106 and/or to any other component within electric vehicle 102, and at least one conductor (not shown) for transmitting data to, and receiving data from, vehicle controller 110 and/or any other component within electric vehicle 102. Alternatively, power conduit 112 may include a single conductor that transmits and/or receives power and/or data, or any other number of conductors that enables system 100 to function as described herein. In an exemplary embodiment, charging device 104 is coupled to an electric power source 114, such as a power grid of an electric utility company, a generator, a battery, and/or any other device or system that provides electricity to charging device 104.

In an exemplary embodiment, charging device 104 is coupled to at least one server 116 through a network, such as the Internet, a local area network (LAN), a wide area network (WAN), and/or any other network or data connection that enables charging device 104 to function as described herein. Server 116, in an exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

In an exemplary embodiment, server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, in an exemplary embodiment, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112. Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106.

Figure 2:
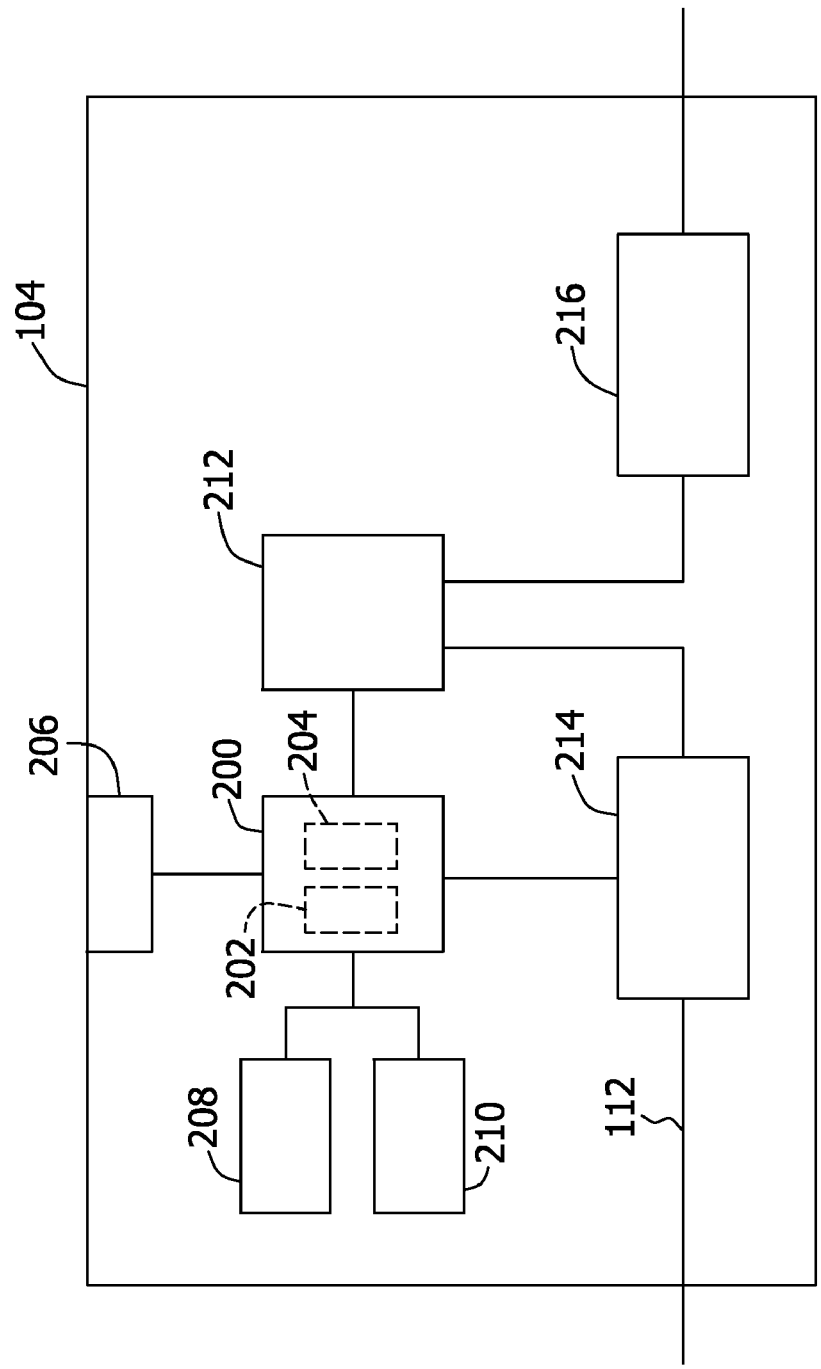
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a meter 212, and to a current control device 214.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 204 includes a computer readable medium, such as, without limitation, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data.

Network interface 206, in an exemplary embodiment, transmits and receives data between controller 200 and a remote device or system. In an exemplary embodiment, network interface 206 is communicatively coupled to at least one other charging device 104 such that charging devices 104 transmit and receive data to and from each other. In an exemplary embodiment, network interface 206 is coupled to a network interface 206 of at least one other charging device 104 using any suitable data conduit, such as an Ethernet cable, a Recommended Standard (RS) 485 compliant cable, and/or any other data conduit that enables charging device 104 to function as described herein. Alternatively, network interface 206 communicates wirelessly with a network interface 206 of at least one other charging device 104 using any suitable wireless protocol.

In an exemplary embodiment, display 208 includes a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In an exemplary embodiment, a charging status of power storage device 106 (shown in FIG. 1), payment information, user authentication information, and/or any other information may be displayed to a user on display 208.

User interface 210 includes, without limitation, a keyboard, a keypad, a touch-sensitive screen, a scroll wheel, a pointing device, a barcode reader, a magnetic card reader, a radio frequency identification (RFID) card reader, a contactless credit card reader, a near field communication (NFC) device reader, an audio input device employing speech-recognition software, and/or any suitable device that enables a user to input data into charging device 104 and/or to retrieve data from charging device 104. In an exemplary embodiment, the user may operate user interface 210 to initiate and/or terminate the delivery of power to power storage device 106. In one embodiment, the user may input user authentication information and/or payment information using user interface 210.

In an exemplary embodiment, current control device 214 is coupled to power conduit 112 and to meter 212. In an exemplary embodiment, current control device 214 is a contactor 214 coupled to, and controlled by, controller 200. In an exemplary embodiment, controller 200 operates, or opens contactor 214 to interrupt the current flowing through power conduit 112 such that power storage device 106 is electrically disconnected from electric power source 114 (shown in FIG. 1). Controller 200 closes contactor 214 to enable current to flow through power conduit 112 such that power storage device 106 is electrically connected to electric power source 114.

In an exemplary embodiment, meter 212 is coupled to power conduit 112 and to controller 200 for use in measuring and/or calculating the current, voltage, power, and/or energy provided from electric power source 114 to power storage device 106. Meter 212 transmits data representative of the measured current, voltage, power, and/or energy to controller 200. In an alternative embodiment, controller 200 includes meter 212 and/or the functionality of meter 212.

In an exemplary embodiment, a current protection device 216 is coupled to meter 212 and to electric power source 114. Current protection device 216 electrically isolates or disconnects charging device 104 from electric power source 114 if the current received from electric power source 114 exceeds a predetermined threshold or current limit. In an exemplary embodiment, current protection device 216 is a circuit breaker. Alternatively, current protection device 216 may be a fuse, a relay, and/or any other device that enables current protection device 216 to function as described herein.

During operation, power storage device 106 of electric vehicle 102 is coupled to charging device 104 using power conduit 112. In one embodiment, a user obtains authorization from server 116 and/or another system or device to enable charging device 104 to charge (i.e., to provide current to) power storage device 106. As described more fully herein, charging device 104 determines an amount of current to provide to power storage device 106 and/or determines whether sufficient capacity, such as transmission or distribution capacity, exists to provide current to power storage device 106.

Figure 3:
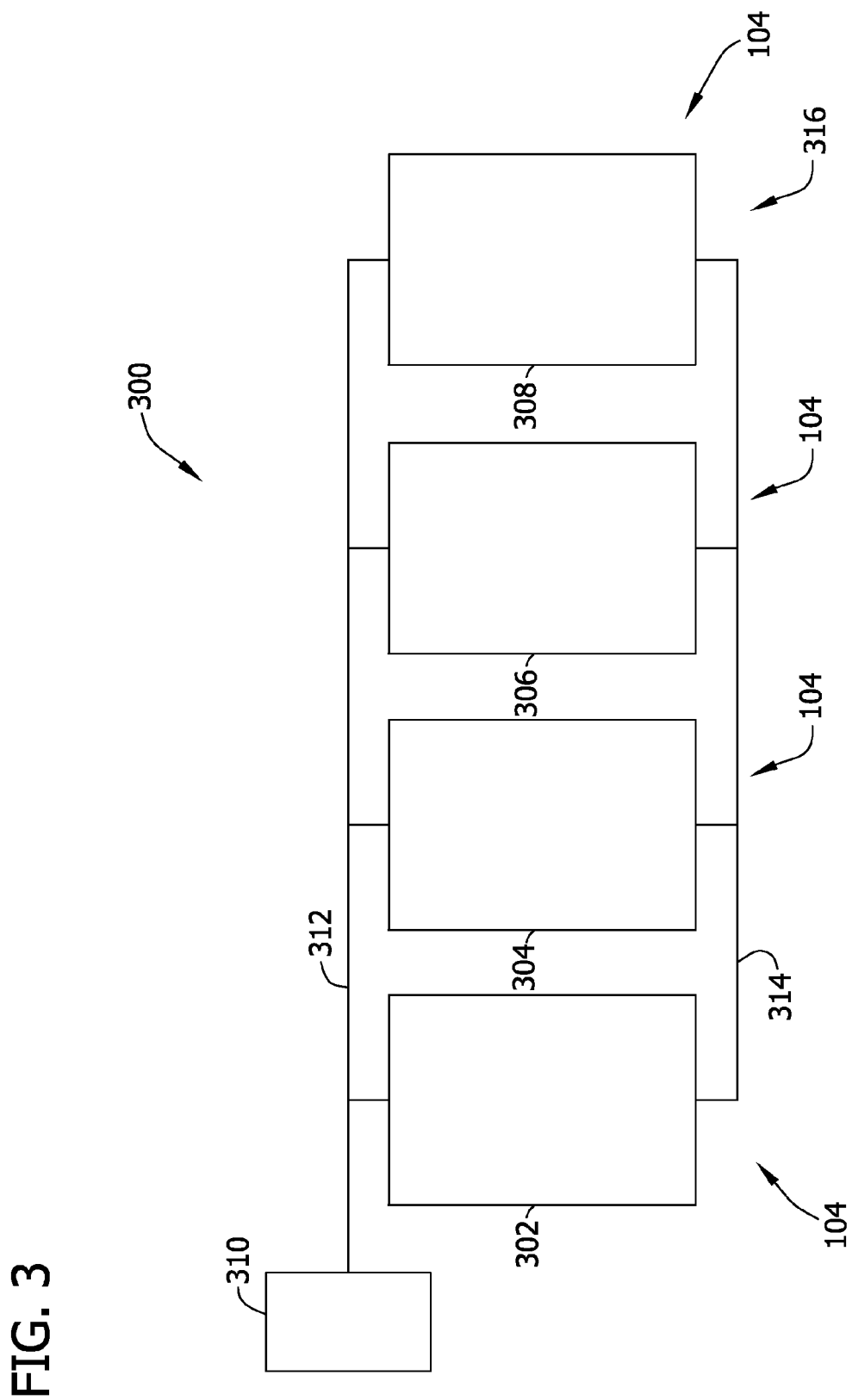
FIG. 3 is a block diagram of an exemplary charging system for charging a plurality of electric vehicles that may be used with the system shown in FIG. 1.

FIG. 3 is a block diagram of an exemplary charging system 300 that may be used to charge a plurality of electric vehicles 102, such as by charging a power storage device 106 (both shown in FIG. 2) of each electric vehicle 102. In an exemplary embodiment, charging system 300 includes a plurality of charging devices 104, such as a first charging device 302, a second charging device 304, a third charging device 306, and a fourth charging device 308. While FIG. 3 illustrates four charging devices 104, charging system 300 may include any number of charging devices 104 as desired.

In an exemplary embodiment, charging devices 104 are coupled to a common electrical distribution device 310 through respective power conduits 312. In an exemplary embodiment, electrical distribution device 310 is a transformer 310 that adjusts a distribution voltage received from electric power source 114 to a voltage suitable for use with charging devices 104. Alternatively, electrical distribution device 310 may be any other device that enables charging system 300 to function as described herein. In an exemplary embodiment, electrical distribution device 310 distributes a requested amount of current to each charging device 104 until the distributed current reaches a current distribution limit. For example, electrical distribution device 310 may be designed or "rated" to distribute a predefined amount of current. Accordingly, the current distribution limit may be set to the predefined amount of current or a current level below the predefined amount. As described more fully herein, each charging device 104 determines an amount of current to draw (or receive) from electrical distribution device 310 and/or to supply to power storage devices 106 based on the current distribution limit and based on the amount of current drawn from other charging devices 104 and/or the amount of current supplied to power storage devices 106 coupled to the other charging devices 104. For example, the amount of current received from electric power source 114 may be different than the amount of current supplied to a power storage device 106 coupled to a charging device 104 as a result of current consumption within charging device 104 and/or current consumption by one or more loads, other than power storage devices 106, coupled to charging device 104. Alternatively, charging devices 104 are coupled to a plurality of electrical distribution devices 310 and each charging device 104 determines the amount of current to draw from one or more electrical distribution devices 310 and/or supply to power storage devices 106 based on the current distribution limits of electrical distribution devices 310 and based on the amount of current drawn from and/or supplied by other charging devices 104.

Charging devices 104, in an exemplary embodiment, are coupled together in data communication by a data bus 314. More specifically, charging devices 104 are coupled to data bus 314 by respective network interfaces 206 (shown in FIG. 2). In an exemplary embodiment, data bus 314 includes at least one data conduit (not shown), such as an Ethernet cable, a Recommended Standard (RS) 485 compliant cable, and/or any other data conduit that enables data bus 314 to function as described herein. Alternatively, charging devices 104 are coupled together in data communication by a wireless network. In an exemplary embodiment, charging devices 104 and/or data bus 314 form a peer-to-peer network 316 that enables each charging device 104 to exchange data with other charging devices 104 coupled to network 316 without requiring a master controller. Alternatively, charging devices 104 and/or data bus 314 may form any other network that enables charging system 300 to function as described herein.

As described more fully herein, in an exemplary embodiment, each charging device 104 transmits at least one request to each other charging device 104 to receive data regarding the current usage and/or expected current usage of each other charging device 104. As used herein, the term "current usage" refers to an amount of current received by a charging device 104 from electric power source 114 and/or from electrical distribution device 310, and/or supplied by charging device 104 to a power storage device 106. Alternatively, each charging device may receive current usage data from another source, such as from a remote computer (not shown), from a subset of charging devices 104 coupled to network 316, and/or from any other source that enables charging system 300 to function as described herein.

Figure 4:
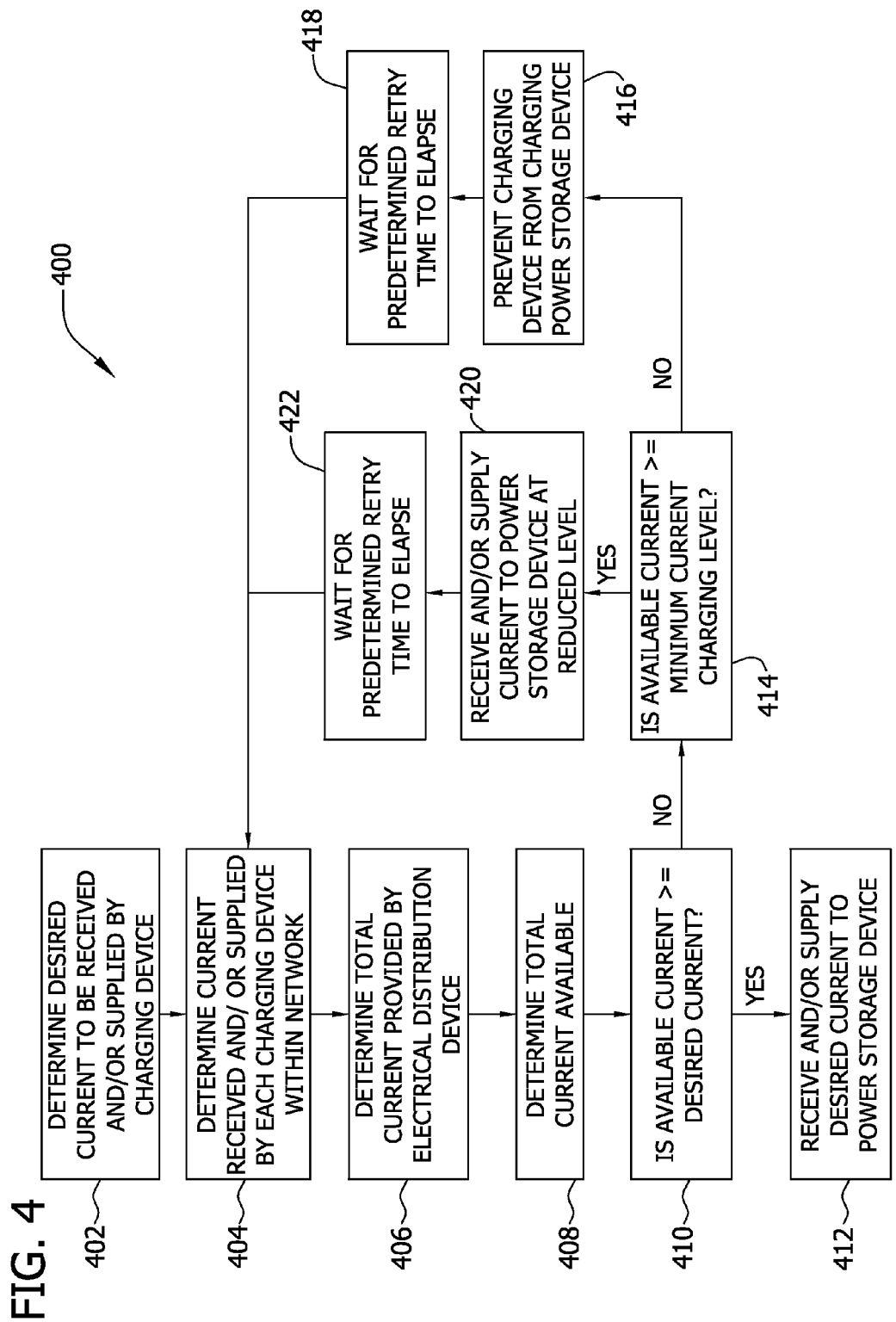
FIG. 4 is a flow diagram of an exemplary method for controlling a charging device that may be used with the charging device shown in FIG. 2.

FIG. 4 is a flow diagram of an exemplary method 400 for controlling a charging device, such as charging device 104 (shown in FIG. 1). In an exemplary embodiment, method 400 is embodied within a plurality of instructions stored within memory device 204, and is at least partially executed by processor 202 (both shown in FIG. 2).

In an exemplary embodiment, power storage device 106 and vehicle controller 110 are coupled to charging device 104 by power conduit 112 (all shown in FIG. 1) and/or by any other conduit or data connection. Initially, a desired amount of current to be received by charging device 104 and/or supplied to power storage device 106 is determined 402. In one embodiment, vehicle controller 110 transmits at least one signal representative of the desired amount of current to be supplied to power storage device 106. In another embodiment, processor 202 determines 402 the desired amount of current to be equal to a rated current limit of charging device 104. As described more fully herein, processor 202 receives the signal and determines whether the desired amount of current and/or any other amount of current may be supplied to power storage device 106.

Charging device 104 determines 404 the current received by and/or supplied by each charging device 104 within network 316 (shown in FIG. 3). In an exemplary embodiment, each charging device 104 is programmed with a number or another identifier that is sequentially greater than the next closest downstream charging device 104 and that is sequentially less than the next closest upstream charging device 104. Accordingly, in an exemplary embodiment, charging devices 104 are indexed and/or numbered from one to the total number of charging devices 104 within network 316 (i.e., from one to four if network 316 includes four charging devices 104). Alternatively, charging devices 104 are indexed, numbered, and/or ordered in any other sequence that enables method 400 to function as described herein.

In an exemplary embodiment, each charging device 104 is programmed with the current distribution limit of electrical distribution device 310 (shown in FIG. 3) and the number of charging devices 104 (or the highest numbered charging device 104) within network 316. Accordingly, in an exemplary embodiment, a charging device 104 determines 404 the current received and/or supplied by each charging device 104 by requesting data representative of the amount of current received and/or supplied by each charging device sequentially from index one to the highest indexed charging device 104 (or in any other order). Such requests are transmitted to each indexed or referenced charging device 104 using network 316. It should be noted that the present charging device 104 will determine 404 its own current received and/or supplied (if any) by referencing meter 212 and/or data stored in memory device 204 (both shown in FIG. 2) rather than transmitting a request to itself. In one embodiment, if a charging device 104 within network 316 does not respond to the request within a predetermined timeout period, the unresponsive charging device 104 is assumed to be receiving and/or supplying about zero amperes of current. Alternatively, any other default current value may be used in place of receiving data from an unresponsive charging device 104.

In an exemplary embodiment, charging device 104 determines 406 a total amount of current provided by electrical distribution device 310 by accumulating or summing the current amounts received and/or supplied by each charging device 104. Charging device 104 determines 408 a total amount of current available to be distributed through or by electrical distribution device 310 by subtracting the total current received and/or supplied from the current distribution limit.

Charging device 104 determines 410 whether the total available current is greater than or equal to the desired amount of current to be received and/or supplied by charging device 104. If the total available current is greater than or equal to the desired amount of current, electrical distribution device 310 is determined to have a sufficient amount of distribution and/or transmission capacity, and charging device 104 receives and/or supplies 412 the desired amount of current to power storage device 106. More specifically, processor 202 controls and/or activates current control device 214 (shown in FIG. 2) to enable the desired amount of current (or at least a portion of the desired amount of current) to flow from electric power source 114 through electrical distribution device 310 and charging device 104 to power storage device 106. In an exemplary embodiment, after charging device 104 commences supplying 412 the desired amount of current to power storage device 106, charging device 104 continues supplying 412 the desired amount of current until power storage device 106 is charged to a desired level or until charging device 104 is otherwise directed to terminate the charging of power storage device 106.

If, however, the total available current is not greater than or equal to the desired amount of current (i.e., if the desired amount of current is greater than the total available current), charging device 104 determines 414 whether the total available current is greater than or equal to a minimum charging level. In an exemplary embodiment, the minimum current charging level is a predetermined minimum current level that power storage device 106 is designed to receive from charging device 104 and/or that charging device 104 is designed to receive from electrical distribution device 310. In one embodiment, the minimum current charging level is about six amperes. Alternatively, the minimum current charging level may be any other value that enables method 400 to function as described herein.

In an exemplary embodiment, if the total available current is not greater than or equal to (i.e., is less than) the minimum current charging level, charging device 104 is prevented 416 from charging power storage device 106. More specifically, processor 202 opens current control device 214, and/or prevents current control device 214 from closing, to prevent 416 current from being received by charging device 104 and/or from being supplied to power storage device 106. Charging device 104 waits 418 for a predetermined time (hereinafter referred to as a "retry time") to elapse. In one embodiment, the retry time is about 15 minutes. Alternatively, the retry time may be any other amount of time that enables method 400 to function as described herein. After the retry time has elapsed, charging device 104 returns to determining 404 the current received and/or supplied by each charging device 104 within network 316. As such, in an exemplary embodiment, charging device 104 (specifically, processor 202) re-determines the amount of current available after the retry time has elapsed.

If the total available current is determined 414 to be equal to or greater than the minimum current charging level (but less than the desired amount of current), charging device 104 receives current and/or supplies 420 current to power storage device 106 at a reduced current charging level (as compared to the desired amount of current). In an exemplary embodiment, the reduced current charging level is equal to the total available current such that charging device 104 receives the total available amount of current and/or supplies the total available amount of current to power storage device 106. Alternatively, the reduced current charging level is any other amount of current that is equal to or greater than the minimum current charging level and that is equal to or less than the total available current. While receiving and/or supplying 420 the reduced level of current to power storage device 106, charging device 104 waits 422 for the predetermined retry time to elapse. After the retry time has elapsed, charging device 104 returns to determining 404 (or redetermining) the current received by and/or supplied by each charging device 104 within network 316.

As described herein, a robust and effective charging device is provided. The charging device includes a processor configured to selectively activate a current control device to supply current to a power storage device of an electric vehicle. The charging device is coupled to at least one other charging device within a peer-to-peer network, and each charging device within the network is configured to receive current from a common electrical distribution device. The charging device determines a desired amount of current to be received and/or provided to the power storage device and determines an amount of current received by and/or supplied by each charging device within the network. A total amount of current available to be received by the charging device and/or provided to the power storage device by the electrical distribution device is determined by summing the current received and/or supplied by each charging device and subtracting the result from a current distribution limit of the electrical distribution device. The charging device may receive and/or supply the desired amount of current, a reduced amount of current, or no current to the power storage device based on a comparison of the desired amount of current and the total available current. Accordingly, each charging device within the network determines whether the electrical distribution device has enough current distribution capability to supply the desired amount of current to each charging device. As such, the charging devices are prevented from exceeding the current distribution limit of the electrical distribution device.

A technical effect of the devices and methods described herein includes at least one of (a) determining a desired amount of current to be at least one of received by a charging device and supplied to a power storage device of an electric vehicle; (b) determining an amount of current available to be at least one of received by a charging device from an electrical distribution device and supplied to the power storage device; and (c) controlling a current control device of a charging device to enable a desired amount of current to be at least one of received and supplied if the desired amount of current does not exceed an amount of current available.

Exemplary embodiments of a charging device, a system, and a method of controlling a charging device are described above in detail. The charging device, system, and method are not limited to the specific embodiments described herein, but rather, components of the charging device and/or system and/or steps of the method may be utilized independently and separately from other components and/or steps described herein. For example, the charging device may also be used in combination with other power systems and methods, and is not limited to practice with only the electric vehicle as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A charging device for use with an electric vehicle including a power storage device, said charging device comprising:
    a current control device configured to selectively enable current to be received from an electrical distribution device and supplied to the power storage device;
    a network interface configured to receive data representative of a current usage of at least one other component coupled to the electrical distribution device; and
    a processor coupled to said current control device and said network interface, said processor configured to:
        determine a first amount of current available to be at least one of received from the electrical distribution device and supplied by said charging device based on the current usage data received; and
        control said current control device to enable a second amount of current to be at least one of received and supplied if the second amount of current does not exceed the first amount of current determined to be available.

2. The charging device in accordance with claim 1, wherein said charging device is one of a plurality of charging devices and wherein the at least one other component coupled to the electrical distribution device is at least one other charging device of the plurality of charging devices, said processor is further configured to determine the first amount of current available based on an amount of current at least one of received by and supplied by the at least one other charging device.

3. The charging device in accordance with claim 2, wherein said charging device is coupled in data communication with the at least one other charging device to form a peer-to-peer network.

4. The charging device in accordance with claim 2, wherein said processor is further configured to determine the first amount of current available by subtracting at least one of the current received by and the current supplied by the at least one other charging device from a current distribution limit of the electrical distribution device.

5. The charging device in accordance with claim 4, wherein said processor is further configured to determine an amount of current at least one of received by and supplied by each of the plurality of charging devices.

6. The charging device in accordance with claim 5, wherein said processor is further configured to determine the first amount of current available by subtracting the current at least one of received by and supplied by each of the plurality of charging devices from the current distribution limit.

7. The charging device in accordance with claim 1, wherein said processor is further configured to activate said current control device to enable a third amount of current to be at least one of received and supplied if the second amount of current exceeds the first amount of current determined to be available and the third amount of current does not exceed the first amount of current determined to be available.

8. The charging device in accordance with claim 1, wherein said processor is further configured to prevent current from being supplied to the power storage device if the first amount of current determined to be available is less than a minimum current charging threshold.

9. The charging device in accordance with claim 8, wherein said processor is further configured to re-determine the first amount of current available after a predetermined time period has elapsed.

10. A system for use in providing current to a plurality of electric vehicles, said system comprising:
    a first charging device configured to receive current from an electrical distribution device and supply at least a portion of the current received to a first power storage device; and a second charging device configured to receive current from the electrical distribution device and supply at least a portion of the current received to a second power storage device, said first charging device comprises:

a current control device configured to selectively enable current to be received from the electrical distribution device and supplied to the first power storage device;

a network interface configured to receive data representative of a current usage of at least one other component coupled to the electrical distribution device; and a processor coupled to said current control device and to said network interface, said processor configured to:

determine a first amount of current available to be at least one of received from the electrical distribution device and supplied to the first power storage device based on the current usage data received; and control said current control device to enable a second amount of current to be at least one of received from the electrical distribution device and supplied to the first power storage device if the second amount of current does not exceed the first amount of current determined to be available.

11. The system in accordance with claim 10, wherein the at least one other component coupled to the electrical distribution device is said second charging device, and wherein said processor is further configured to determine the first amount of current available based on the amount of current at least one of received and supplied by said second charging device.

12. The system in accordance with claim 10, wherein said first charging device is coupled in data communication with said second charging device to form a peer-to-peer network.

13. The system in accordance with claim 10, wherein said processor is further configured to determine the first amount of current available by subtracting at least one of the current received and the current supplied by said second charging device from a current distribution limit of the electrical distribution device.

14. The system in accordance with claim 10, wherein said processor is further configured to activate said current control device to enable a third amount of current to be at least one of received and supplied if the second amount of current exceeds the first amount of current determined to be available and the third amount of current does not exceed the first amount of current determined to be available.

15. The system in accordance with claim 10, wherein said processor is further configured to prevent current from being at least one of received by said first charging device and supplied to the first power storage device if the first amount of current determined to be available is less than a minimum current charging threshold.

16. The system in accordance with claim 15, wherein said processor is further configured to re-determine the first amount of current available after a predetermined time period has elapsed.

17. A method for controlling a charging device for use with an electric vehicle, said method comprising:

receiving data representative of a current usage of at least one component coupled to the charging device using a network interface of the charging device;

determining a desired amount of current to be at least one of received by the charging device and supplied to a power storage device of the electric vehicle;

determining an amount of current available to be at least one of received by the charging device from an electrical distribution device and supplied to the power storage device based on the current usage data received; and controlling a current control device of the charging device to enable the desired amount of current to be at least one of received and supplied if the desired amount of current does not exceed the amount of current determined to be available.

18. The method in accordance with claim 17, further comprising coupling a plurality of charging devices together to form a peer-to-peer network, wherein the charging device is one of the plurality of charging devices.

19. The method in accordance with claim 17, wherein the charging device is one of a plurality of charging devices within a network, said method further comprising determining an amount of current at least one of received and supplied by each charging device of the plurality of charging devices.

20. The method in accordance with claim 19, wherein determining an amount of current available comprises subtracting the amount of current at least one of received and supplied by each charging device from a current distribution limit of the electrical distribution device.

* * * * *